United States Patent [19]

Sano

[11] Patent Number: 4,977,420
[45] Date of Patent: Dec. 11, 1990

[54] CAMERA WITH DEVELOPMENT FUNCTION

[75] Inventor: Yoshikazu Sano, Osaka, Japan

[73] Assignee: Matsushita Electric Industrial Co., Ltd., Osaka, Japan

[21] Appl. No.: 326,040

[22] Filed: Mar. 17, 1989

[30] Foreign Application Priority Data

Mar. 24, 1988 [JP] Japan .................................. 63-70025

[51] Int. Cl.$^5$ ............................................. G03B 17/50
[52] U.S. Cl. ....................................... 354/79; 354/83; 354/86; 354/289.1; 354/295
[58] Field of Search ...................... 354/75, 76, 79, 83, 354/84, 85, 86, 87, 289.1, 105, 106, 109, 217, 295

[56] References Cited

U.S. PATENT DOCUMENTS

| | | | |
|---|---|---|---|
| 2,496,630 | 2/1950 | Land | 354/86 |
| 2,873,658 | 2/1959 | Land | 354/83 |
| 3,369,469 | 2/1968 | Downey | 354/86 |
| 3,650,188 | 3/1972 | Whall | 354/212 |
| 3,653,313 | 4/1972 | Leduc | 354/289.1 |
| 3,896,469 | 7/1975 | Mather | 354/86 |
| 4,006,487 | 2/1977 | Allen et al. | 354/79 |
| 4,021,825 | 5/1977 | McCann et al. | 354/79 |
| 4,034,386 | 7/1977 | Gold | 354/86 |
| 4,497,552 | 2/1985 | Howard et al. | 354/106 |
| 4,561,742 | 12/1985 | Stella et al. | 354/86 |

Primary Examiner—A. A. Mathews
Attorney, Agent, or Firm—Wenderoth, Lind & Ponack

[57] ABSTRACT

This invention relates to a camera with development function used in microscophic photography, in which a cover is disposed at the opening of a compartment case for containing developed films, and the opening is closed by this cover after containing developed films, and then the compartment case is dismounted from the camera main body. Thus, paper fibers and chemical particles used in the films will not drift in the air. Therefore, when used in a clean room, the room air will not be contaminated. Furthermore, the camera of this invention possesses various features suited for use in the clean room, such as the transparent compartment case so that the exposure and focus precision can be checked from outside the compartment case, and conductive treatment of the compartment case so as to prevent attraction of dust.

24 Claims, 3 Drawing Sheets

CAMERA WITH DEVELOPMENT FUNCTION

BACKGROUND OF THE INVENTION

This invention relates to a camera which is used as an attachment to an optical or electron microscope in a clean room or the like for the manufacture of semiconductor devices.

Generally, products requiring ultrafine processing such as semiconductor devices are manufactured in a clean room in which the number of dust particles in the air is strictly limited. For fabrication of semiconductor devices, it is necessary to check and analyze the surface state and sectional shape of the semiconductor elements by means of an optical or electron microscope.

Conventionally, for such an analysis, a camera as shown in FIG. 4 is attached to the optical microscope or electron microscope to take photographs of the surface and section of the semiconductor elements.

The camera shown in FIG. 4 is a so-called instant camera, in which each film is loaded into a camera main body 1, and after completion of every photography, a film leader 2 projecting from a film outlet 3 is pulled out, and a film 4 is drawn out, and the developing chemical spread on the film surface is pressed widely by a roller for development.

However, when such conventional camera is used in the clean room, paper fibers and chemical particles used on the film 4 are scattered about in the space from the film outlet 3 when pulling out the film 4, and the clean room is contaminated.

Recently, with the aim of solving such a problem and also improving the efficiency of microscopic photography, a compartment case 5 for covering the film outlet 3 is detachably mounted on the camera main body 1 as shown in FIG. 5, and the film is completely developed within the camera main body 1 and is then sent out into the compartment case 5 sequentially. In such a camera, if dust is generated when the developed film is sent out, the dust is only sent into the compartment case 5, and does not drift in the clean room.

In this case, however, in order to check the developed film, when the compartment case 5 is dismounted from the camera main body 1, the dust in the compartment case 5 is released from the opening of the compartment case 5 and contaminates the clean room.

To avoid this problem, the camera main body 1 must be dismounted from the microscope without detaching the compartment case 5, and the camera main body 1 must be brought out of the clean room, and then the film must be taken out. As a result, however, the frequency of entering and leaving the clean room increases, which leads to drop of the cleanness in the clean room. Still more, since the camera main body 1 must be mounted and dismounted on and from the microscope every time, the total photographic efficiency is not improved.

There is another problem, that is, since the compartment case 5 is made of an opaque resin case, the photographic state cannot be checked during operation. When taking several pictures serially, it is necessary to check the exposure, focus, color and other factors on the first film to determine the conditions for the subsequent films, but since the developed film is contained in the opaque compartment case 5, the exposure and focus cannot be checked. In order to check them, it is necessary, as stated above, to take out the entire camera main body 1 from the clean room, and take out the film. Hence, the problems of contamination of the clean room by frequent access cannot be avoided. Or when this checking is neglected, all the films taken serially may be failures in certain cases.

Furthermore, when taking out the camera main body 1 and the compartment case 5 together from the clean room and then removing the compartment case 5, several films contained in the compartment case 5 often drop on the floor, and which picture is taken at which time may not be known, and the photograph checking is thus very difficult.

SUMMARY OF THE INVENTION

It is a first object of this invention to prevent drift of dust when the film compartment case is dismounted from the camera main body.

It is a second object of this invention to reduce photographic errors by checking the exposure, focus, color, etc. from outside the compartment case.

It is a third object of this invention to prevent attraction of dust by static electricity of the compartment case.

It is a fourth object of this invention to facilitate the photographic checking task and reducing checking errors by identifying the order of the photography when plural pictures are taken serially.

In sum, this invention features a cover which is disposed in the film compartment case in such a manner as to seal the opening for the film compartment case in a manner free to open and close. In a different embodiment of the invention, at least part of the compartment case is transparent. In a further different embodiment, the compartment case itself is made of conductive material, or the surface of the compartment case is coated with conductive material. In a still different embodiment, serial codes are marked on the plural pictures taken.

Thus, when a cover openably sealing the opening for the film compartment case is disposed on the compartment case, by taking out the compartment case from the camera main body after sealing the compartment case by the cover, only the compartment case can be taken out of the clean room without drifting the dust in the clean room. Therefore it is not necessary to detach the camera main body from the microscope every time, and the total working efficiency is enhanced. Moreover, by making transparent at least a part of the compartment case, the exposure, focus and color can be confirmed from outside the compartment case, and photographic errors can be reduced. In addition, by the conductive treatment of the compartment case, generation of static electricity at high voltage is prevented, and attraction of dust by static electricity can be prevented. Additionally, since the serial codes are provided on the pictures sent into the compartment case, the pictures can be identified at a glance, and photographic checking job is facilitated, and checking errors can be securely prevented.

Other features of the invention will be better understood and appreciated from the following detailed description taken in conjunction with the drawings.

DETAILED DESCRIPTION OF THE INVENTION

Figure 1:
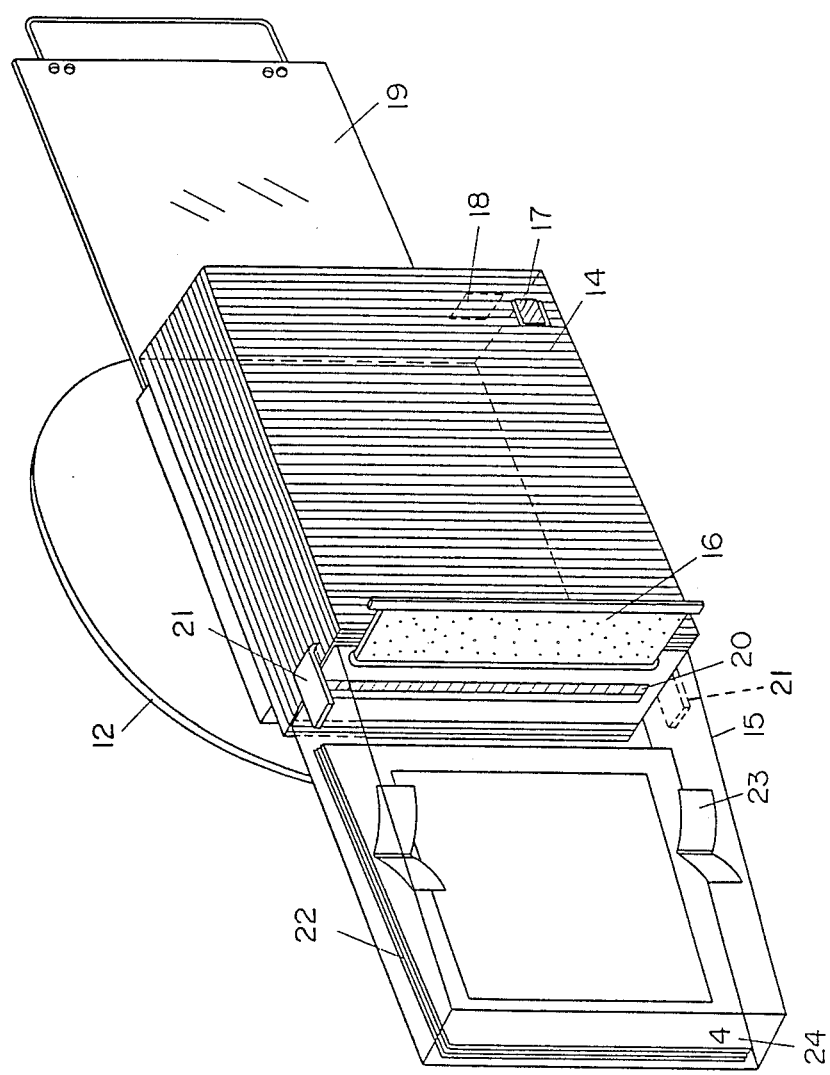
FIG. 1 is a perspective view of a camera in one of the embodiments of the invention.
Figure 2A:
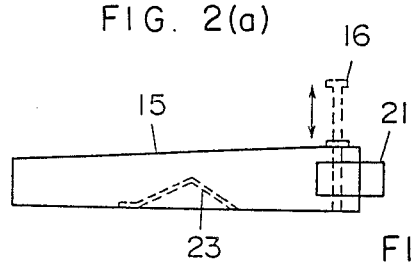
FIG. 2 (a), FIG. 2 (b), FIG. 2 (c) are a side view, front view, plan view of the compartment case thereof respectively.
Figure 2B:
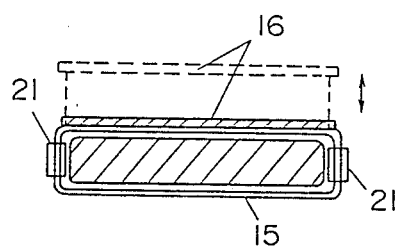
Figure 2C:
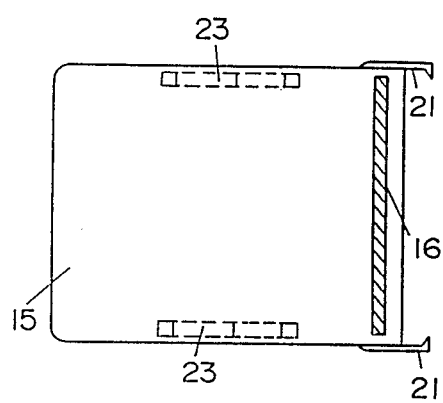
Figure 3:
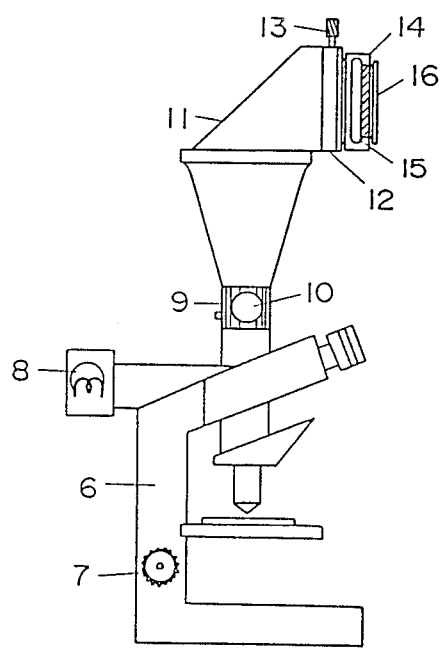
FIG. 3 is a side view of the state of mounting the camera of FIG. 1 on a microscope.
Figure 4:
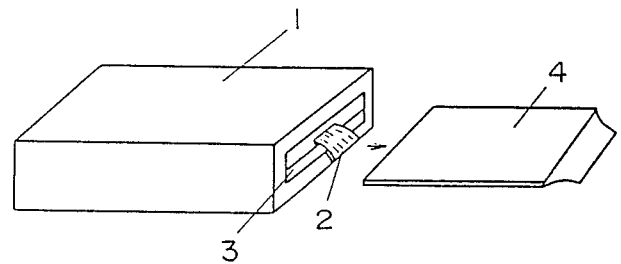
FIG. 4 is a perspective view of a conventional camera.
Figure 5:
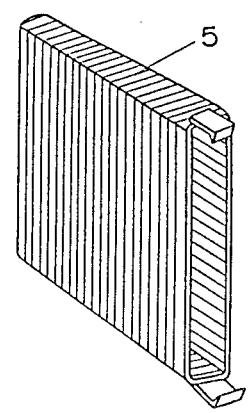
FIG. 5 a perspective view of a conventional compartment case.

Referring now to FIGS. 1 to 3, one of the embodiments of this invention is described below.

As shown in FIG. 3, the camera is mounted on an optical microscope. The optical microscope 6 is provided with a focus adjusting screw 7, illuminating light source 8, shutter 9, and view finder 10. In the uppermost part of the optical microscope 6, there is an attachment 11 for detachably mounting the camera on. At the front side of the camera main body 14 a holder 12 is disposed, and by mounting the holder 12 on the end of the attachment 11 and tightening a holder clamp screw 13, the camera main body 14 can be detachably mounted on the attachment 11. At the side of the camera main body 14, a compartment case 15 is detachably attached. A cover 16 is openably disposed on the compartment case 15.

FIG. 1 depicts a practical structure of the camera shown in FIG. 3. The camera main body 14 has its front side affixed to the holder 12, and a film feed button 17 is provided at the rear side. At the side of the camera main body 14, a photographic number display window 18 is provided. At the front side of the camera main body 14, a light shielding plate 19 is slidably mounted. Meanwhile, inside the camera main body 14, the camera mechanism for taking pictures and the film feed mechanism for feeding developed films are contained, but since these mechanism are not related with the nature of the invention directly, they are not shown inside the camera main body 14 for the convenience of explanation. The compartment case 15 is detachably attached to the camera main body 14 by means of fixing claws 21, 21 so as to cover the film outlet 20 at the side of the camera main body 14. In this compartment case 15, as shown in FIG. 2 (a), (b), (c), a slidable cover 16 is disposed near the opening for containing film. At both sides therein, film holding springs 23 for neatly stacking up and storing the developed films 22 being sent in. In this embodiment, the entire surface of the compartment case 15 is made of transparent material. Numeral 24 denotes a number shown in part of the film 22.

In this constitution, when the cover 16 is pulled out with the compartment case 15 being mounted on the camera main body 14 as shown in FIG. 1, the developed films 22 are sequentially sent out from the film outlet 20 into the compartment case 15 by the operation of the film feed button 17, and are stacked up and held as being pressed down by the film holding springs 23. After taking a specified number of pictures, the cover 16 is pushed in as indicated by the solid line shown in FIG. 2 (b) to seal the opening for receiving film of the compartment case 15, and the fixing claws 21, 21 are opened, and the compartment case 15 is dismounted from the camera main body 14. At this time, paper fibers and dust are generated in the compartment case 15, but since it is sealed by the cover 16, dust will not drift out of the compartment case 15. Therefore, if the compartment case 15 is detached inside the clean room, the air will not be contaminated. Therefore, the operator can detach only the compartment case 15 and take it out of the clean room, so that the working efficiency may be greatly improved as compared with the conventional job of dismounting the entire camera main body from the microscope to be taking out of the clean room.

Additionally, since the compartment case 15 is made of a transparent material, the exposure, focus and color of the developed film 22 may be judged from outside the compartment case 15 at a glance. It is hence possible to prevent anxiety during work or failure of all pictures. It is, however, not necessary to make the entire surface of the compartment case 15 transparent, and only the portion necessary for checking the photographic condition of the developed film 22 may be made transparent.

Still more, although not shown in the drawings, the compartment case 15 itself may be made of conductive material, or the surface may be coated with conductive material, the generation of static electricity at high voltage due to feeding of the developed film 22 may be prevented, which makes it possible to prevent attraction of dust into the compartment case 15. Thus, the contamination around the camera may be kept to a minimum in the clean room, and especially in the region of high cleanness.

Furthermore, when the developed films 22 are provided with serial numbers 24, if the films are shuffled, the sequence of photography will be instantly known, and therefore, confusion in checking may be avoided. Alternately instead of serial numerals, alphabetical letters or other symbols may be similarly used. Such numerals may be either punched mechanically on each film or displayed simultaneously when developing.

For example, if 10 films are contained in the camera main body 14, and four of them are used in the first job, and the fifth and subsequent films may be used in the next job. In such a case, when the counting number is displayed in the photographic number display window 18 after use of every film, the remainder of the films may be known at a glance, which adds greatly to the convenience of use.

We claim:

1. A camera attachment for receiving an exposed photographic film dispensed from a film outlet of a self-developing camera, said camera attachment comprising:
   a compartment casing having an opening;
   attaching means for detachably mounting said compartment casing to the self-developing camera so as to enclose the film outlet of the self-developing camera, said opening of said compartment casing being positioned upon mounting of said compartment casing to the self-developing camera so as to receive the exposed photographic film dispensed from the film outlet within said compartment casing; and,
   an opening cover for closing said opening of said compartment casing so as to seal the exposed photographic film within said compartment casing prior to and subsequent to detachment of said compartment casing from the self-developing camera.

2. A camera attachment as recited in claim 1, at least a portion of said compartment casing being transparent to permit observation of an exposed photographic film disposed therein.

3. A camera attachment as recited in claim 1, said compartment casing comprising one of a conductive material and a conductive coating.

4. A camera attachment as recited in claim 2, said compartment casing comprising one of a conductive material and a conductive coating.

5. A camera attachment as recited in claim 1, said compartment casing comprising a display window positioned so as to permit observation of an identification mark of an exposed photographic film disposed therein.

6. A camera attachment as recited in claim 2, said compartment casing comprising a display window positioned so as to permit observation of an identification mark of an exposed photographic film disposed therein.

7. A camera attachment as recited in claim 3, said compartment casing comprising a display window positioned so as to permit observation of an identification mark of an exposed photographic film disposed therein.

8. A camera attachment as recited in claim 4, said compartment casing comprising a display window positioned so as to permit observation of an identification mark of an exposed photographic film disposed therein.

9. A photographic device comprising:
 a self-developing camera having a film outlet for dispensing an exposed photographic film;
 a compartment casing having an opening;
 attaching means for detachably mounting said compartment casing to the self-developing camera so as to enclose the film outlet of the self-developing camera, said opening of said compartment casing being positioned upon mounting of said compartment casing to the self-developing camera so as to receive the exposed photographic film dispensed from the film outlet within said compartment casing; and,
 an opening cover for closing said opening of said compartment casing so as to seal the exposed photographic film within said compartment casing prior to and subsequent to detachment of said compartment casing from the self-developing camera.

10. A photographic device as recited in claim 9, at least a portion of said compartment casing being transparent to permit observation of an exposed photographic film disposed therein.

11. A photographic device as recited in claim 9, said compartment casing comprising one of a conductive material and a conductive coating.

12. A photographic device as recited in claim 10, said compartment casing comprising one of a conductive material and a conductive coating.

13. A photographic device as recited in claim 9, said compartment casing comprising a display window positioned so as to permit observation of an identification mark of an exposed photographic film disposed therein.

14. A photographic device as recited in claim 10, said compartment casing comprising a display window positioned so as to permit observation of an identification mark of an exposed photographic film disposed therein.

15. A photographic device as recited in claim 11, said compartment casing comprising a display window positioned so as to permit observation of an identification mark of an exposed photographic film disposed therein.

16. A photographic device as recited in claim 12, said compartment casing comprising a display window positioned so as to permit observation of an identification mark of an exposed photographic film disposed therein.

17. A photographic device as recited in claim 9, further comprising means for operatively attaching said self-developing camera to a microscope apparatus.

18. A photographic device as recited in claim 10, further comprising means for operatively attaching said self-developing camera to a microscope apparatus.

19. A photographic device as recited in claim 11, further comprising means for operatively attaching said self-developing camera to a microscope apparatus.

20. A photographic device as recited in claim 12, further comprising means for operatively attaching said self-developing camera to a microscope apparatus.

21. A photographic device as recited in claim 13, further comprising means for operatively attaching said self-developing camera to a microscope apparatus.

22. A photographic device as recited in claim 14, further comprising means for operatively attaching said self-developing camera to a microscope apparatus.

23. A photographic device as recited in claim 15, further comprising means for operatively attaching said self-developing camera to a microscope apparatus.

24. A photographic device as recited in claim 16, further comprising means for operatively attaching said self-developing camera to a microscope apparatus.

* * * * *